Patented Feb. 14, 1950

2,497,308

UNITED STATES PATENT OFFICE 2,497,308

PREPARATION OF ETHYLENEUREA

Alfred T. Larson, Wilmington, Del., assignor to E. I. du Pont de Nemours & Company, Wilmington, Del., a corporation of Delaware No Drawing. Application March 1, 1944, Serial No. 524,527

8 Claims. (Cl. 260—309)

This invention relates to a process for the preparation of N.N'ethyleneurea, and more particularly to its preparation from ethylene diamine and carbon dioxide.

N.N'ethyleneurea, hereinafter referred to as ethyleneurea, and otherwise known as 2 oxo imidazolidin and imidazolidon (2), has been made by heating ethylene diamine with diethyl carbonate at 180° C. [E. Fisher, Koch, A 232, 227 (1886)], by warming an aqueous solution of N.N'ethylene thiourea with freshly precipitated mercuric oxide [Klut Ar. 240, 677 (1887)], and by distillation of aqueous N.N'ethylene guanidine under diminished pressure [Pierron A 9 (11) 363 (1908)]. Ethyleneurea has remained more or less a laboratory curiosity, however, for the above processes to date have been of only academic significance.

An object of the present invention is to provide improved processes for the preparation of ethyleneurea. Another object of the invention is to provide a process for the preparation of ethyleneurea from ethylene diamine and carbon dioxide or compounds which under reaction conditions form carbon dioxide. A further object is to provide a process for the preparation of ethyleneurea from mixtures of ethylene diamine with carbon dioxide under elevated temperatures and pressures. Other objects and advantages of the invention will hereinafter appear.

The invention may be illustrated by the equation:

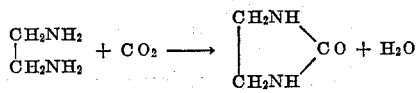

which, while it stoichiometrically illustrates the reaction it should be appreciated that a number of intermediate reactions may take place, and that intermediate products may be formed. Accordingly the equation illustrates the overall or summating reaction.

Broadly, the process of the invention may be described as involving the high temperature reaction of ethylene diamine with carbon dioxide. It may be carried out by charging aqueous or anhydrous ethylene diamine and carbon dioxide into a pressure resisting autoclave and heating the contents to effect the reaction. Upon the addition of carbon dioxide to ethylene diamine there first forms, under most conditions, ethylene diamine carbamate; this product is formed rapidly with the evolution of heat. If substantially equimolar portions of reactants or an excess of carbon dioxide are used the ethylene diamine carbamate formed is a solid reaction product which is difficult, because of its physical form, to heat to reaction temperatures at which the ethyleneurea is made. If the solid reaction product, however, is carefully heated, the solid gradually liquefies as the temperature approaches 200° C. At temperatures of approximately 250° the solid particles have largely disappeared. If suitable precautions are taken a fluid mass, slurry or homogeneous solution can be obtained at this stage of the reaction. With the fluid mass or slurry, which may be obtained by the use of a molar excess of ethylene diamine, the same general phenomenon occurs as occurs when heating the solid reaction product and because of the greater fluidity of this mass, heat can be more readily added to it than to the solid reaction product. If the reaction is so conducted that a homogeneous solution is formed which results, for example, from using still higher amounts of ethylene diamine and/or water, it also is preferably heated to a temperature range specified above although in this instance there are apparently no solid particles requiring liquefaction. If the reaction is conducted in accord with a continuous process (in contrast to a batch process) ethylene diamine carbamate appears to have but a transient existence in the solid phase, if it exists at all in that phase.

Irrespective of the physical form of the intermediate products the process of this invention is preferably conducted in such a manner that a temperature of about 175° C. is attained, the ethyleneurea being produced in substantial amounts when the reactants are heated to a temperature between 200° C. and 300° C. and preferably to a temperature between 225° and 270° C. with the conversion to ethyleneurea dropping off below 200° C. and for all practical purposes disappearing in those reactions which are not heated above about 175° C. Elevated pressures are preferably used and may range from 10 to 500 atmospheres or even more, autogenous pressures being used if desired.

The reaction may, if desired, be carried out in the absence of pressure. When so conducted carbon dioxide and the vapors of ethylene diamine with or without water are passed into a suitable reaction converter and the reaction effected under the temperatures specified above.

It is not necessary to add carbon dioxide directly to the reaction mixture but only necessary that carbon dioxide be present during the reaction. Consequently compounds which decompose or otherwise form carbon dioxide during the course of the reaction may be introduced into the reaction in lieu of carbon dioxide. For this purpose there may be used ammonium carbonate, ammonium bicarbonate, ammonium carbamate, and ethylene diamine carbamate.

The ratio of the ethylene diamine to carbon dioxide may vary over a wide range. For example, the carbon dioxide may be present in excess, or the ethylene diamine may be present in excess, giving in the case of excess ethylene diamine, basic reaction conditions. Accordingly, there may be present from 0.1 to 15 moles of carbon dioxide per mole of the ethylene diamine. The reaction is, however, preferably conducted with an excess of ethylene diamine which gives an easily pumped fluid which can be rapidly heated. A 2 to 25% excess on a molecular weight basis is usually ample for this purpose. For optimum results as the carbon dioxide concentration increases the pressure should be increased while decrease in pressure is indicated as the ethylene diamine concentration is increased.

The reaction will produce ethyleneurea in the presence or absence of water or other suitable inert diluent such as the alcohols; methanol, ethanol and propanol or the lower molecular weight ethers; such as methyl ether, ethyl ether, or the like. The azeotrope of ethylene diamine and water (84% diamine, 16% water) or other suitable aqueous solutions of ethylene diamine containing from 10 to 50% water may be employed as well as the anhydrous compound.

The ethyleneurea may be separated from the crude reaction mixture by evaporation, by vacuum distillation or by steam distillation, i. e. by heating up the mixture to distillation temperature while passing steam through it. Alternatively, the crude product may be subjected to crystallization for the separation of ethyleneurea, the crystallization being conducted in a suitable solvent therefor.

The examples illustrate preferred embodiments of the invention, wherein parts are by weight unless otherwise indicated.

*Example 1.*—A silver-lined pressure resisting shaker tube was charged with 0.5 mole of ethylene diamine and 2.96 moles of carbon dioxide. The mixture was gradually heated to 255° C. over a period of about 30 minutes and the pressure increased in the autoclave from approximately 75 atmospheres to approximately 325 atmospheres. The product was extracted with chloroform and crystallized to give a yield of about 65% ethyleneurea based on the ethylene diamine charged.

*Example 2.*—The process of Example 1 was repeated using 1.33 moles of ethylene diamine and 4.5 moles of carbon dioxide. In this case the temperature was gradually raised to 200° C. over a period of about 60 minutes. The pressure rose to 230 atmospheres. The yield of ethyleneurea based on ethylene diamine charged was about 70%.

*Example 3.*—The process of Example 1 was repeated using 1.25 moles of ethylene diamine and 11.4 moles of carbon dioxide. The temperature was raised to approximately 220° C. in about 25 minutes. The pressure rose to 820 atmospheres where it was held for 90 minutes. The yield of ethyleneurea was about 90% based on the ethylene diamine charged.

*Example 4.*—The process of Example 1 was repeated using 0.5 mole of ethylene diamine, 0.8 mole of water and 5.0 moles of carbon dioxide. The reaction mixture was heated for about 60 minutes and to a temperature of approximately 250° C. the pressure ranging from approximately 230 atmospheres to approximately 860 atmospheres. The yield of ethyleneurea was about 89% based on the ethylene diamine charged.

*Example 5.*—A silver-lined shaker tube having a volume of about 325 cc. was charged with 53 grams of ethylene diamine and 100 grams of gaseous carbon dioxide. The pressure on the cooled tube after charging was about 60 atmospheres. While the tube was agitated it was slowly heated from room temperature to 150° C. The heating required 35 minutes, and the pressure attained at 150° C. was about 175 atmospheres. The temperature was held at 150° C. for about one hour. The tube was cooled and discharged and 83.4 grams of a solid product was recovered which upon analysis was found to be 100% ethylene diamine carbamate.

*Example 6.*—The process of Example 5 was essentially duplicated except that 30 grams of ethylene diamine were charged into the shaker tube and 100 grams of gaseous carbon dioxide introduced to give an initial pressure of about 60 atmospheres. The temperature was then raised to 199° C. during the first 30 minutes of heating and held for one hour at approximately the same temperature. The pressure rose to approximately 200 atmospheres. The tube was cooled and 48.9 grams of product recovered which upon analysis indicated a yield of 44.8% ethyleneurea based on the ethylene diamine charged.

The process, if desired, may be carried out continuously by passing carbon dioxide and ethylene diamine as a liquid or vapor continuously into a reaction zone, e. g. a long silver-lined and jacketed reaction tube, wherein the reaction is conducted under the above defined conditions, the crude reaction product being continuously discharged from the reaction zone and thereafter the ethyleneurea continuously recovered from said product. The reaction zone may be charged with inert solid material such as charcoal, silica gel and the like to aid in effecting intimate contact between the reactants.

I claim:

1. A process for the preparation of ethyleneurea which comprises subjecting carbon dioxide and ethylene diamine to a reaction at a temperature between 175 and 300° C. and at a pressure of at least 10 atmospheres.

2. A process for the preparation of ethyleneurea which comprises subjecting carbon dioxide and ethylene diamine to a reaction under pressure appreciably above atmospheric until an addition product is obtained and thereafter subjecting the addition product to a temperature between 175 and 300° C.

3. A process for the preparation of ethyleneurea which comprises subjecting a reaction mixture containing from 0.1 to 15 moles of carbon dioxide per mole of ethylene diamine to a reaction at a temperature between 175 and 300° C. under autogenous pressure.

4. A process for the preparation of ethyleneurea which comprises subjecting a mixture of carbon dioxide and ethylene diamine containing an excess of the ethylene diamine on a molar basis to a reaction at a temperature between 175 and 300° C. and at a pressure of at least 10 atmospheres.

5. A process for the preparation of ethyleneurea which comprises subjecting a mixture containing equimolar proportions of carbon dioxide and ethylene diamine to a reaction at a temperature between 175 and 300° C. and at a pressure of at least 10 atmospheres.

6. A process for the preparation of ethyleneurea which comprises subjecting carbon dioxide and ethylene diamine to a reaction at a temperature between 175 and 300° C. and at a pressure of at least 10 atmospheres and thereafter removing ethyleneurea from the reaction mixture.

7. A continuous process for the preparation of ethyleneurea which comprises continuously passing carbon dioxide and ethylene diamine into a reaction zone maintained at a temperature between 175 and 300° C. under pressure appreciably above atmospheric, continuously discharging therefrom the reaction product and continuously separating ethyleneurea from said reaction product.

8. A process for the preparation of ethyleneurea which comprises subjecting carbon dioxide and ethylene diamine to a reaction at a temperature between 200 and 300° C. and under pressure appreciably above atmospheric.

ALFRED T. LARSON.

REFERENCES CITED

The following references are of record in the file of this patent:

UNITED STATES PATENTS

| Number | Name | Date |
| --- | --- | --- |
| 1,307,570 | Wenkel | June 24, 1919 |
| 1,785,730 | Davis | Dec. 23, 1930 |
| 1,816,087 | Lindner et al. | July 28, 1931 |
| 2,276,696 | Olin | Mar. 17, 1942 |

FOREIGN PATENTS

| Number | Country | Date |
| --- | --- | --- |
| 123,138 | Germany | July 30, 1901 |

OTHER REFERENCES

Fisher-Koch, Annalen, vol. 232, p. 227 (1886).
Chem. Abstracts, vol. 32, p. 488.